United States Patent
Groenewald

(10) Patent No.: US 9,481,526 B1
(45) Date of Patent: Nov. 1, 2016

(54) VIBRATORY CONVEYOR

(71) Applicant: Eugene Groenewald, Woerden (NL)

(72) Inventor: Eugene Groenewald, Woerden (NL)

(73) Assignee: Key Technology, Inc., Walla Walla, WA (US)

(*) Notice: Subject to any disclaimer, the term of this patent is extended or adjusted under 35 U.S.C. 154(b) by 0 days.

(21) Appl. No.: 14/923,767

(22) Filed: Oct. 27, 2015

(51) Int. Cl.
| B65G 27/24 | (2006.01) |
| B65G 27/32 | (2006.01) |
| B65G 27/04 | (2006.01) |
| B65G 27/08 | (2006.01) |

(52) U.S. Cl.
CPC .............. *B65G 27/24* (2013.01); *B65G 27/04* (2013.01); *B65G 27/08* (2013.01); *B65G 27/32* (2013.01)

(58) Field of Classification Search
CPC ...... B65G 27/04; B65G 27/08; B65G 27/32; B65G 27/24
USPC ........................................................ 198/769
See application file for complete search history.

(56) References Cited

U.S. PATENT DOCUMENTS

| 3,581,871 A | 6/1971 | Forman |
| 3,786,912 A | 1/1974 | Taylor |
| 4,378,064 A | 3/1983 | Brown |
| 5,462,155 A | 10/1995 | Demar et al. |
| 6,105,753 A | 8/2000 | Graham |
| 7,213,700 B2 | 5/2007 | Narukawa et al. |
| 8,096,407 B1 | 1/2012 | Gregor |
| 8,770,389 B2 | 7/2014 | Millard et al. |
| 9,132,966 B1 * | 9/2015 | Groenewald ......... B65G 27/08 |
| 9,181,037 B1 * | 11/2015 | Tomlinson ............ B65G 27/24 |
| 2001/0019009 A1 | 9/2001 | Gilman |
| 2001/0054543 A1 | 12/2001 | Sleppy et al. |
| 2011/0316360 A1 | 12/2011 | Rhinehart |

FOREIGN PATENT DOCUMENTS

EP    2208693 A2    7/2010

* cited by examiner

Primary Examiner — Gene Crawford
Assistant Examiner — Keith R Campbell
(74) Attorney, Agent, or Firm — Randall Danskin

(57) ABSTRACT

A conveyor assembly includes a reciprocally moveable conveyor bed, having a product conveying surface, and a magnetic drive which is oriented in spaced relation relative to the conveyor bed and which, when energized, imparts reciprocal motion to the conveyor bed to move the product along the product conveying surface of the conveyor bed.

23 Claims, 11 Drawing Sheets

VIBRATORY CONVEYOR

TECHNICAL FIELD

The present invention relates to a conveyor assembly for transporting a stream of products along a conveying surface, and more specifically to a vibratory conveyor assembly which employs an improved drive assembly, and which imparts a desirable reciprocal motion to a conveyor bed so as to transport a product therealong.

BACKGROUND OF THE INVENTION

The uses of vibratory conveyors, of various designs are well known. These devices have been employed in assorted industry segments for decades. One particular form of vibratory conveyor, that being, the excited frame vibratory conveyor, has found widespread usage in food processing and other industries. Excited frame conveyor construction, and their operation are well known. In most forms of the invention, a base frame which rests upon, or is suspended from, a supporting surface mounts one, or more, out-of-balance electric motors, which rotate an eccentric weight in order to impart a vibratory force, which is directed along a given line of reference passing through the center of mass of the adjacent vibratory conveyor bed, this vibratory force causes the vibratory conveyor bed to reciprocate in a given direction by means of a multiplicity of leaf springs, which moveably support the conveyor bed on the base frame.

The aforementioned excited frame vibratory conveyors are extremely reliable and are convenient to use. Notwithstanding the high reliability of such excited frame conveyors, shortcomings in the operation of such devices have been the attention of designers, and the users of such devices, for many years. For example, designers of such excited frame conveyors have known, for some period of time, that as the conveyor bed length increases, certain resonant vibratory frequencies are generated as the conveyor bed begins to reciprocate following the energizing of these aforementioned, out-of-balance motors. These resonant vibratory frequencies, under certain conditions, can cause undesirable motion in the conveyor bed. These resonant frequencies become an increasing problem as the conveyor bed becomes longer. Solutions to avoid these resonance modes employing the aforementioned out-of-balance motors have entailed utilizing various schemes and methodology to energize out-of-balance motors in a predetermined manner so as to prevent these resonance modes from causing adverse side-to-side or twisting motions, or yawing, of the conveyor bed, about its longitudinal axis. These schemes have included so-called "ramp up" or "ramp down" energizing of the respective out-of-balance motors in specific sequences so as to minimize the resonance modes that are generated. Still further, the generation of these resonance modes, which causes adverse movement of the conveyor bed, especially at longer lengths, has caused another problem to arise, that being, the premature wear, or breakage of the leaf springs which resiliently support the conveyor bed on the base frame.

In addition to the foregoing, the use of out-of-balance motors employing eccentric weights has long known problems which are associated with the premature wear of bearings, which support the rotating shafts of the electric motors bearing the eccentric weights. As should be understood, from time-to-time such out-of-balance motors need to be replaced due to excessive bearing wear. In addition to the foregoing, the previously mentioned excited bed conveyors when installed, and rendered operable, utilize given eccentric weights, which provides a predetermined frequency of vibration for the accompanying conveyor bed. As should be understood, depending upon the weight of the product being transported by the conveyor bed, adjustment of this vibratory force, which is imparted to the conveyor bed, is difficult to change, absent replacement of the eccentric weights, which are rotated by the out-of-balance motor. Changing these weights takes some period of time to accomplish. Therefore, there is currently no convenient means to make both a frequency and amplitude change of the amount of force that an out-of-balance motor provides to a conveyor bed, absent significant revisions to the drive arrangement of such prior art excited frame conveyors. Further, for extremely long conveyors, and which may have multiple motors at given locations along the length of the conveyor bed, such conveyors employ a rather complex system to control these motors. Finally, the use of out-of-balance motors limits the designer to the use of a system, which employs merely a vibratory force, which is most accurately depicted as a sine-wave, and does not allow a designer to employ vibratory force, which may best be understood as being a complex wave form. Such a complex vibratory wave form may be useful for moving specific particulate matter along a given conveyor bed.

Other designs of drive assemblies have been fabricated to avoid the aforementioned problems. For example the present inventor has conceived the drive assembly employing a pair of spaced electromagnets and which are effective when selectively energized to impart reciprocal motion to a conveyor bed. The Office's attention is directed to the teachings as found in U.S. Pat. No. 9,132,966 the teachings of which are incorporated by reference herein.

The present invention, as described hereinafter, avoids the detriments associated with the prior art practices utilized heretofore, and provides a new vibratory conveyor assembly for moving particulate product along a conveyor bed, in a particularly noteworthy manner.

SUMMARY OF THE INVENTION

A first aspect of the present invention relates to a vibratory conveyor which includes an elongated, reciprocally moveable conveyor bed having a product conveying surface; a stationary base for supporting the elongated conveyor bed; a multiplicity of elongated springs communicating between the elongated conveyor bed and the stationary base to support the elongated conveyor bed in reciprocally movable relation relative to the stationary base; and a magnetic drive which is oriented in spaced relation relative to the elongated conveyor bed, and which, when energized, imparts reciprocal motion to the elongated conveyor bed so as to move a product along the product conveying surface of the elongated conveyor bed.

Still another aspect of the present invention relates to a conveyor assembly which includes an elongated reciprocally moveable conveyor bed having a product conveying surface, and which further has a center of mass, and a given weight; a stationary base supported by a supporting surface, and wherein the stationary base supports the elongated reciprocally moveable conveyor bed in a predetermined, spaced relationship relative to the supporting surface, and wherein the stationary base has a given weight; a plurality of elongated springs which resiliently couple the elongated reciprocally moveable conveyor bed to the stationary base, and further locates the elongated reciprocally moveable conveyor bed in spaced relation relative to the stationary base; a drive assembly which, when electrically energized, generates a periodic, reciprocal physical force that imparts reciprocal motion to the elongated moveable conveyor bed so as to effect a movement of a product along the product conveying surface; a controller electrically coupled to the drive assembly, and which directs impulses of electrical energy to the drive assembly, and wherein the drive assembly produces sequential magnetic attraction forces and magnetic repulsion forces which in turn generate a reciprocating vibratory force which is imparted to the elongated reciprocally moveable conveyor bed so as to cause movement of the product along the product conveying surface and along a path of travel.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the Constitutional purposes of the U.S. Patent Law "to promote the progress of science in useful arts" [Article I, Section 8].

Figure 1:
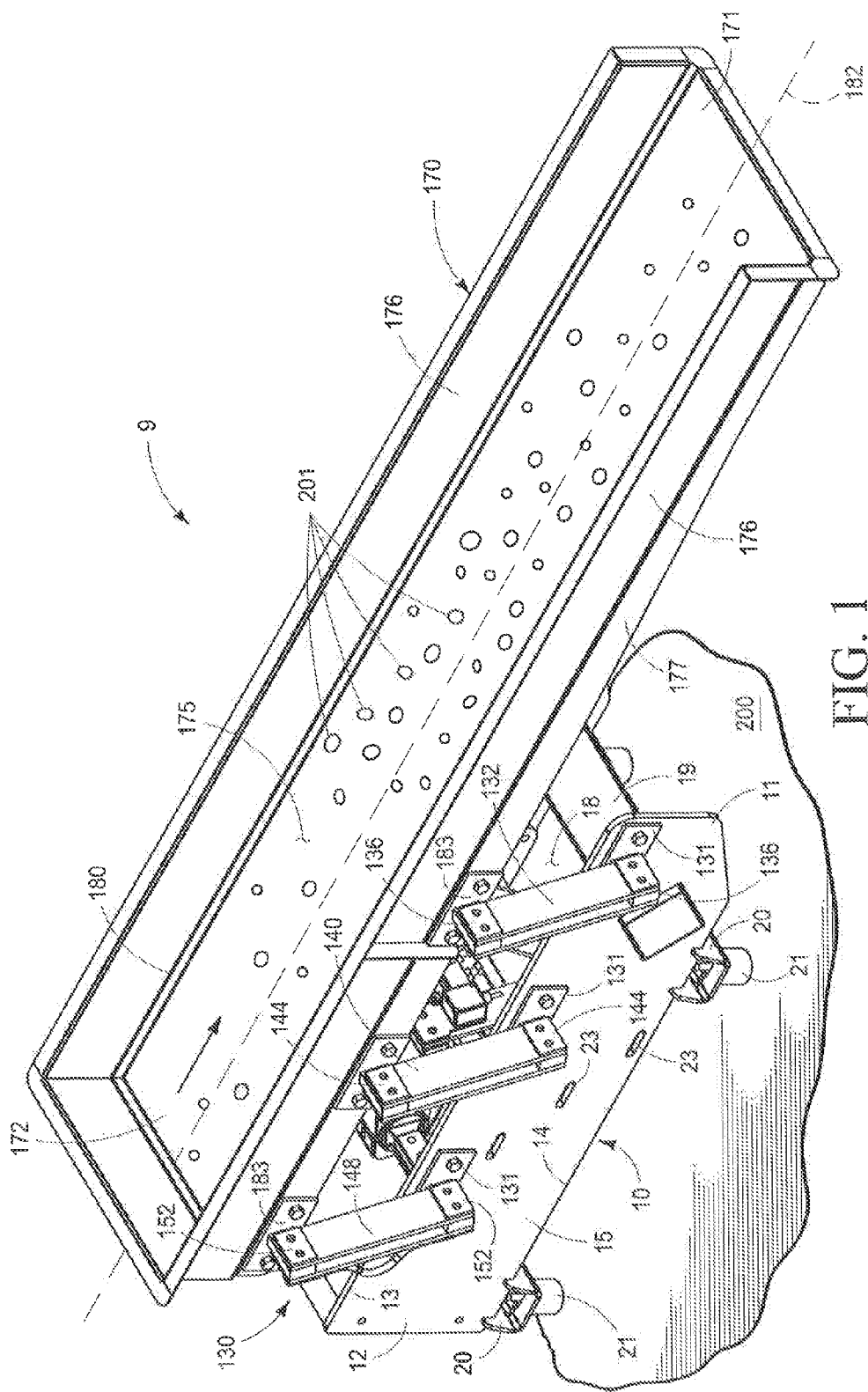
FIG. 1 is an isometric top, side elevation view of one form of the vibratory conveyor of the present invention.

The vibratory conveyor having a drive assembly of the present invention is generally indicated by the numeral 9 in FIG. 1. The vibratory conveyor 9 comprises a stationary base 10; a drive assembly 30; a support frame 130; a reciprocally movable elongated conveyor bed 170; and a controller 190. The vibratory conveyor 9, as depicted in FIG. 1, rests in spaced relation relative to a supporting surface 200, here illustrated, as an underlying floor. However, it should be understood that the vibratory conveyor 9, as depicted herein, may be suspended from an overhead supporting surface (not shown), such as a ceiling, mezzanine, or the like, in various, industrial applications or environments. Further, it should be understood that although only one drive assembly 30 is shown in the accompanying drawings for powering the reciprocally movable elongated conveyor bed 170, it is expressly contemplated that plural drive assemblies 30 may function synchronously to power longer and/or larger reciprocally movable elongated conveyor beds 170.

Figure 2:
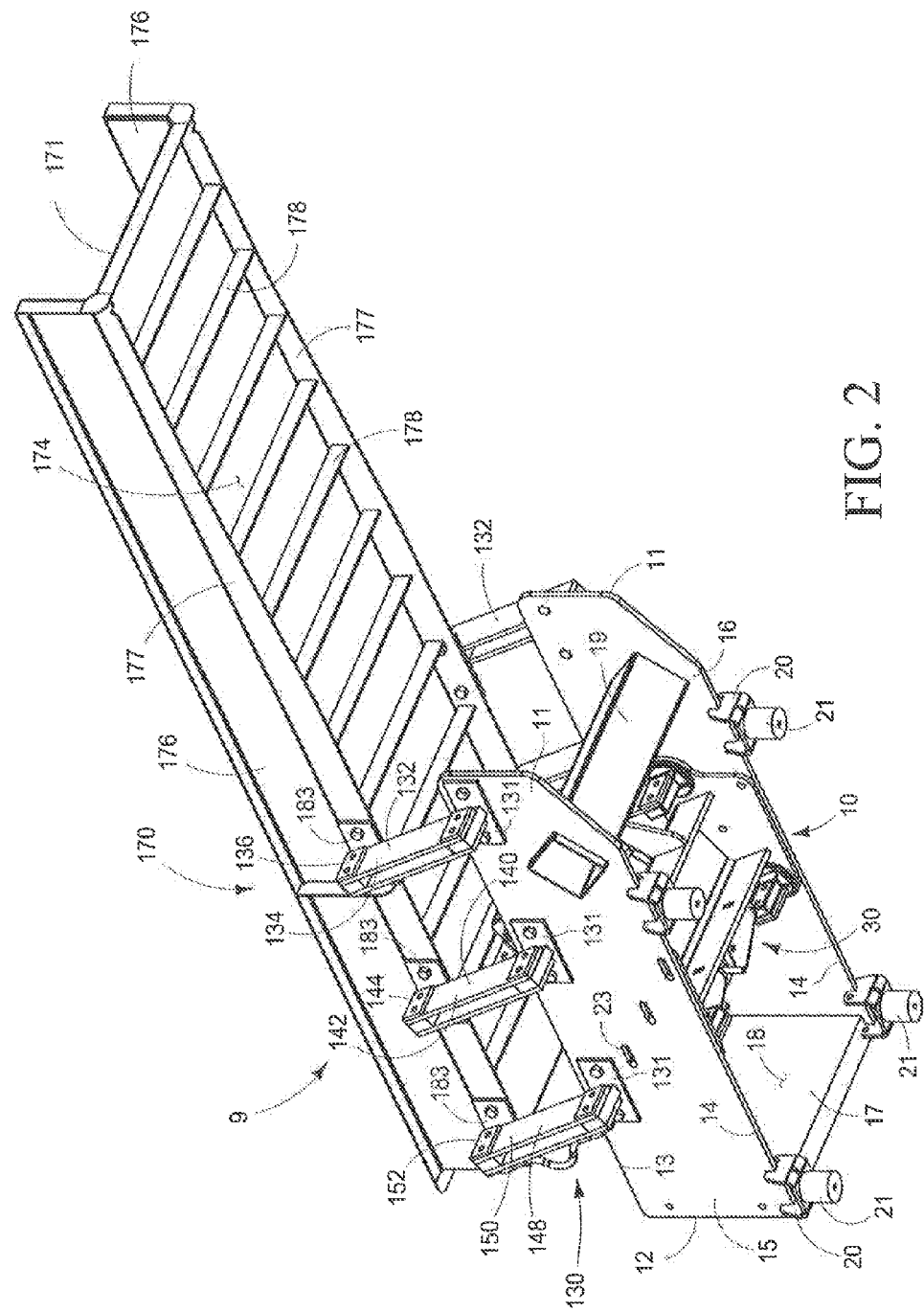
FIG. 2 is an isometric bottom view of the vibratory conveyor as seen in FIG. 1.
Figure 6:
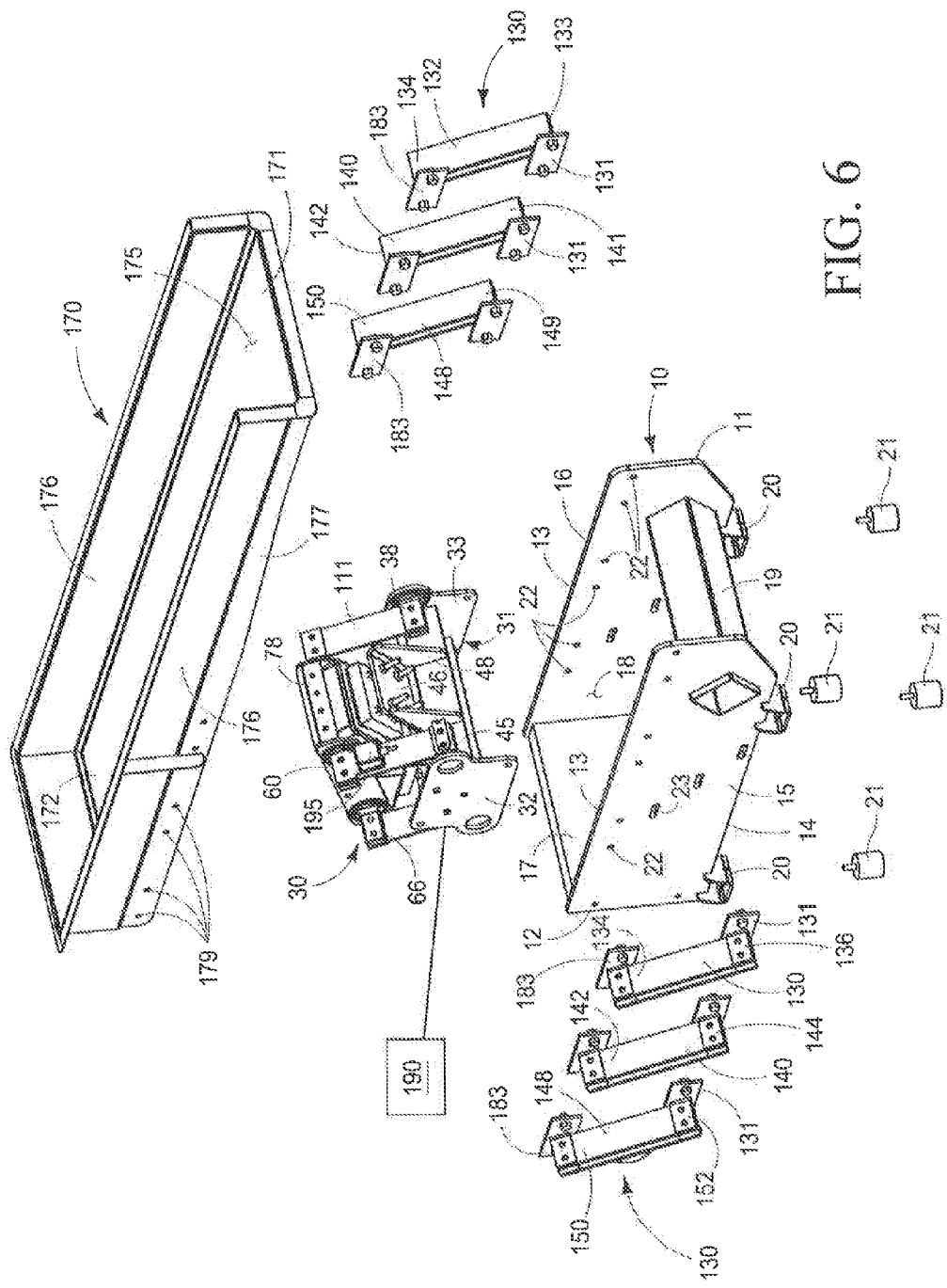
FIG. 6 is an exploded, isometric view of the vibratory conveyor, as seen in FIG. 1.

The stationary base 10 (FIG. 2) is somewhat "U" shaped in configuration, and has a first side panel 15, and a spaced apart, and parallel second side panel 16. Each of the side panels 15, 16 have a first end 11, an opposite second end 12, a top edge 13, a bottom edge of 14, and further defines a plurality of aligned, spacedly arrayed, and elongated holes 23 to adjustably mount the drive assembly 30. An end panel 17 communicates between the first side panel 15, and the second side panel 16, at the second end 11. The end panel 17 causes the first side panel 15, and the second side panel 16 to be spaced apart from one another, and further defines a medial channel 18 therebetween. A spacing beam 19, which may be in the form of a box beam, extends transversely between the first side panel 15, and the second side panel 16, and is further located within the medial channel 18. The spacing beam 19 is located at a position which is spacedly adjacent to the first end 11, and the bottom edge 14. The stationary base 10 has a given mass, and weight, as will be discussed in further detail hereinafter. The stationary base 10 further includes support feet brackets 20, and supporting feet 21, which locate or orient the stationary base 10 in a spaced relationship relative to the underlying supporting surface 200. (FIG. 1). The supporting feet 21 may include resilient members to dampen, or otherwise dissipate, vibrational forces, which may be experienced by, or imparted to, the stationary base 10, and prevent these vibrational forces from being transmitted to the underlying supporting surface 200. Additionally, and as seen in FIG. 6, a plurality of pairs of spring support holes 22 are defined or formed in the first and second side panels 15, 16 and oriented in a predetermined spacedly adjacent locations near the top edge 13. The spring support holes 22 cooperate with or carry frame spring supports 131 for the support frame 130 as will be discussed hereinafter.

The support frame 130 comprises a plurality of frame spring supports 131 which are individually affixed, such as by welding or by means of releasable fasteners, to the first and second side panels 15, 16 respectively of the stationary base 10. The fasteners matingly cooperate with the spring support holes 22. The respective frame spring supports 131 are oriented and located in a given angular and spaced relationship one relative to the other, so as to position attached elongated resilient springs 132, 140, 148 in a given angular orientation relative to a spaced reciprocally movable, and elongated conveyor bed 170 which will be discussed in greater detail, below.

As seen in FIG. 1 and following, the vibratory conveyor apparatus 9 of the prevent invention includes a multiplicity of pairs of elongated and resilient springs 132, 140, 148 of conventional design. The multiplicity of pairs of elongated and resilient springs 132, 140, 148 include a first pair of elongated resilient springs 132; a second pair of elongated and resilient springs 140; and a third pair of elongated and resilient springs 148. It is expressly contemplated that additional pairs of elongated and resilient springs, or fewer pairs of elongated and resilient springs may be used with the instant invention depending upon the length of the elongated reciprocally movable conveyor bed 170 which is supported thereby. In the disclosed embodiment, three pairs of elongated and resilient springs are used. Each of the respective pairs of elongated and resilient springs 132, 140, 148, has a first, lower end portion 133, 141 and 149 respectively and which are further individually mounted on each of the respective frame spring supports 131. The first, lower end portions 133, 141 and 149, and the second upper end portions 134, 142, 150 of each of the multiplicity of pairs of elongated and resilient springs defines fastener holes (not shown) to carry fasteners (not shown), and which extend therethrough. Further, a fastening plate, 136 144 and 152 may be used in conjunction with the fasteners (not shown) and which extend through the fastener holes (not shown) to provide a more secure and more durable interconnection between the elongated and resilient springs 132, 140 and 148 and the spring supports 131, 183. As earlier noted, the frame spring supports 131 are fastened to the stationary base 10. A multiplicity of pairs of conveyor bed spring supports 183 are mounted to the reciprocally movable elongated conveyor bed 170 along support edge 177 by fastening means, such as by welding or using conventional fasteners, as will be described, below. The second upper end portions 134, 142 and 150 of the respective elongated and resilient springs 132, 140 and 148 are attached to the respective pairs of conveyor bed spring supports 183 carried by the reciprocally movable elongated conveyor bed 170. Fastening plates 136, 144 and 152 may similarly be used to provide a secure interconnection at the second upper end portions 134, 142 and 150 of the elongated resilient spring legs 132, 140 and 148 to the conveyor bed spring supports 183.

Figure 4:
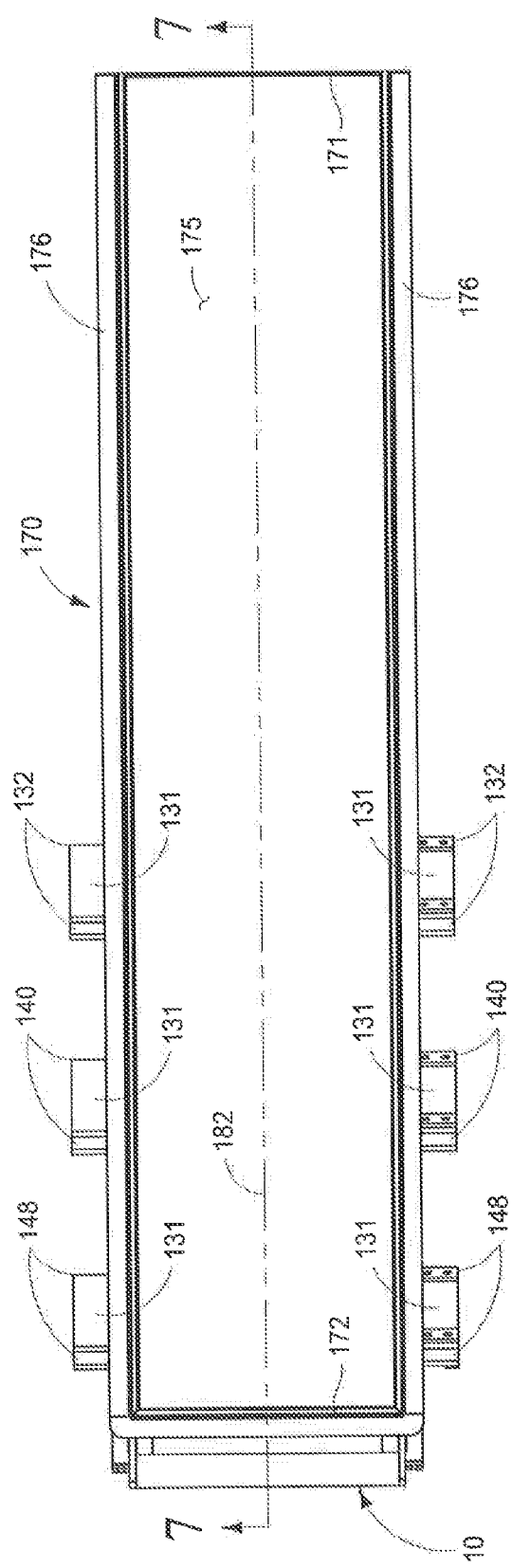
FIG. 4 is a top, plan view of the vibratory conveyor, as seen in FIG. 1.

The multiplicity of pairs of elongated and resilient springs 132, 140 and 148 are oriented substantially along, and in spaced relation, relative to a longitudinal axis 182 of the reciprocally movable elongated conveyor bed 170, as will be discussed in greater detail, hereinafter. (FIG. 4).

Figure 3:
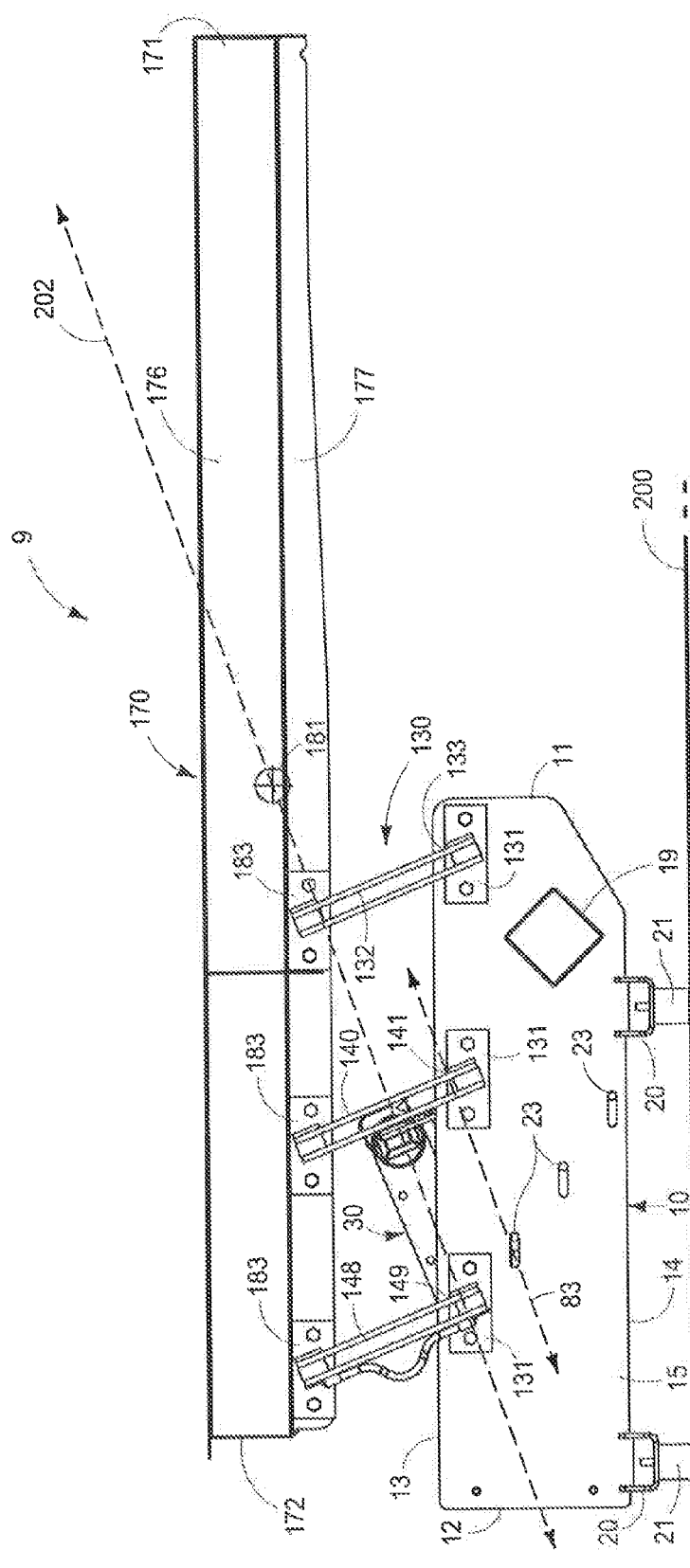
FIG. 3 is an orthographic side elevation view of the vibratory conveyor as seen in FIG. 1.
Figure 5:
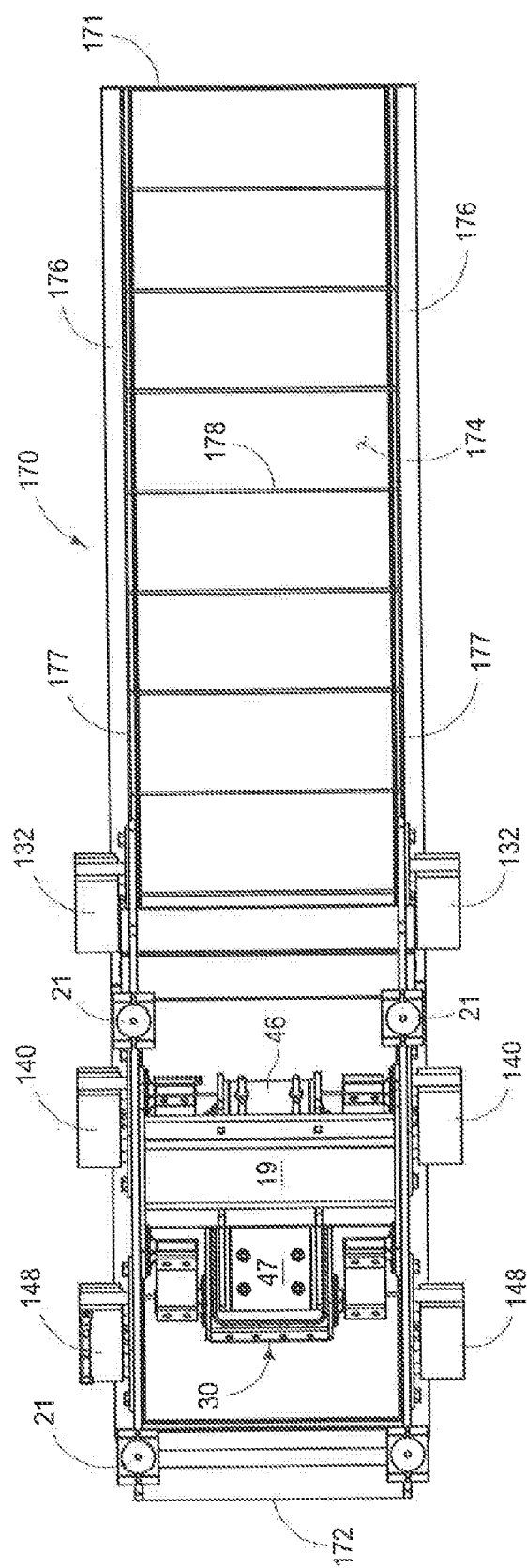
FIG. 5 is a bottom, plan view of the vibratory conveyor, as seen in FIG. 1.

The vibratory conveyor 9 includes a reciprocally moveable and elongated conveyor bed 170 which is supported in predetermined spaced relation relative to both the supporting surface 200, and the stationary base 10, by the multiplicity of pairs of elongated and resilient springs 132, 140 and 148, which were discussed, above. The reciprocally moveable and elongated conveyor bed 170 is of substantially traditional design, and has a predetermined weight. The reciprocally moveable and elongated conveyor bed 170 has a main body 180, which is shown in the accompanying figures as being generally narrowly rectangular in shape. The main body 180 further has a product conveying surface 175, which is substantially horizontally oriented. However, some forms of the invention may include a product conveying surface 175 which may be angled, slightly upwardly or downwardly, so as to move a product 201 therealong. The product conveying surface 175 has a first end 171, and a second end 172. The main body 180 further has a center of mass, which is generally indicated by the 181. (FIG. 3). The main body 180 further includes a pair of generally vertically extending sidewalls 176, and which are positioned on opposite sides of the product conveying surface 175, and which are further operable to confine the product 201 (FIG. 1) on the product conveying surface 175 for transport or movement between the second end 172 and in the direction of the first end 171. The product conveying surface 175 has an opposite, downwardly facing, bottom surface 174. (FIG. 5). A pair of elongated support edges 177 are carried on the bottom surface 174, and are oriented vertically below, and aligned with, each of the vertically extending side walls 176. Each support edge 177 defines plural spacedly arrayed conveyor spring support holes 179 (FIG. 6) and which facilitate the mounting of the respective conveyor spring supports 183 there to as earlier noted. The main body 180 further has a longitudinal axis 182. Plural transversely oriented, and spaced apart strengthening cross members 178, (FIG. 5) extend between the respective support edges 177 along the bottom surface 74 so as to provide strength and rigidity to the reciprocally movable and elongated conveyor bed 170.

The present invention 9 includes a novel, drive assembly which is generally indicated by the numeral 30, and which is carried by the stationary base 10, and is located within the medial channel 18 which is defined by the stationary base 10. The drive assembly 30 includes a drive saddle 31, and a magnet holder 60 which will be described in detail, below.

Figure 8:
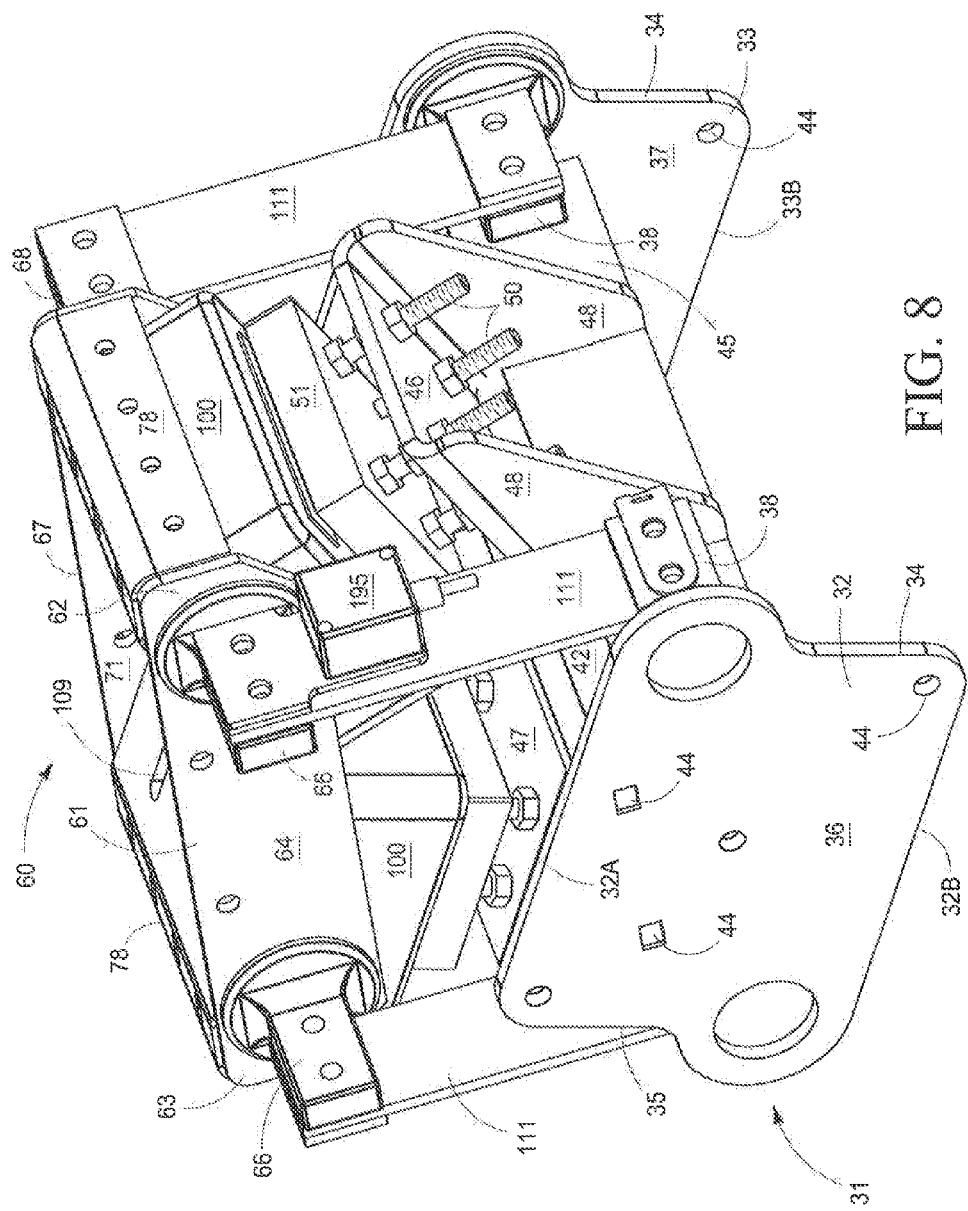
FIG. 8 is an isometric side elevation view of the drive assembly which forms a feature of the present invention.
Figure 9:
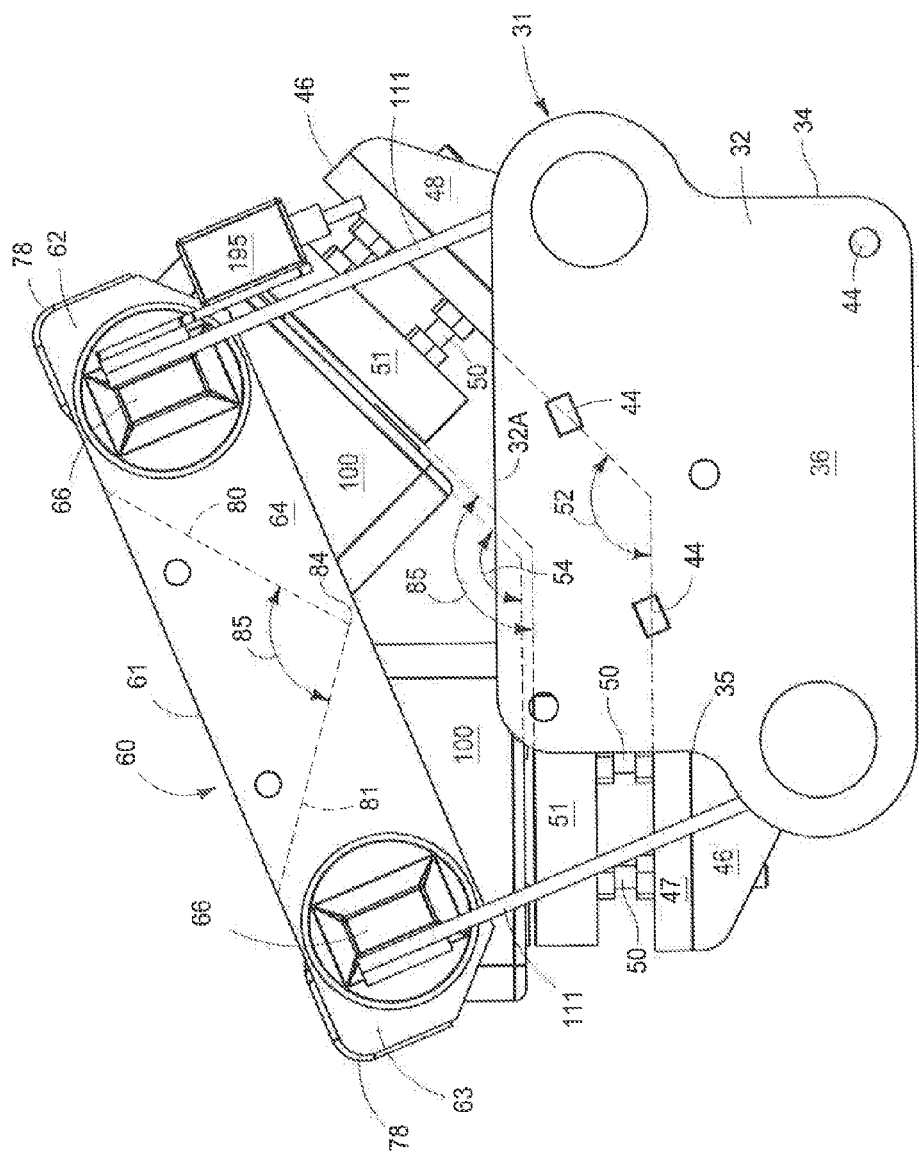
FIG. 9 is a side elevation view of the drive assembly as seen in FIG. 8.
Figure 10:
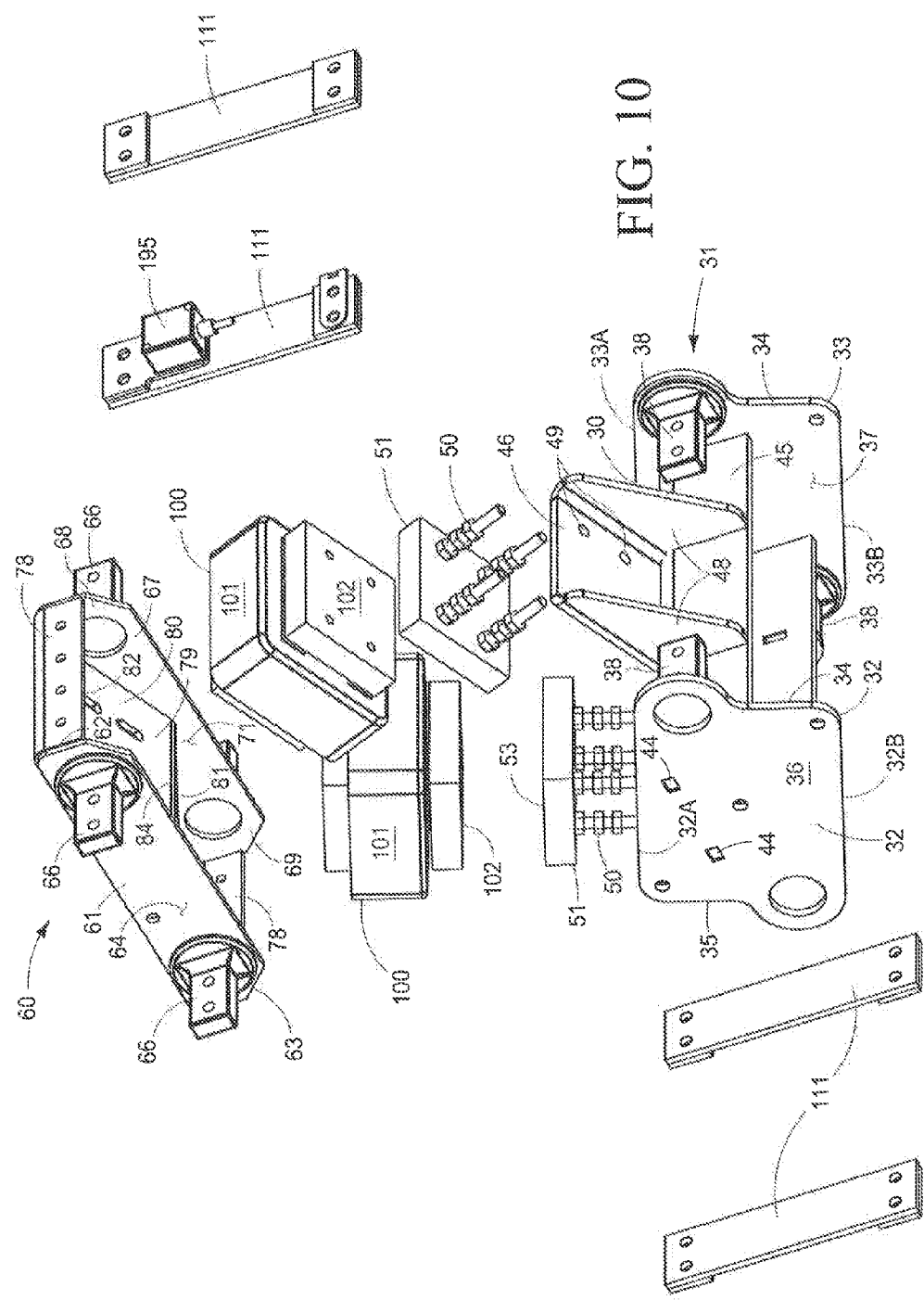
FIG. 10 is an exploded, isometric view of the drive assembly as seen in FIG. 8.
Figure 11:
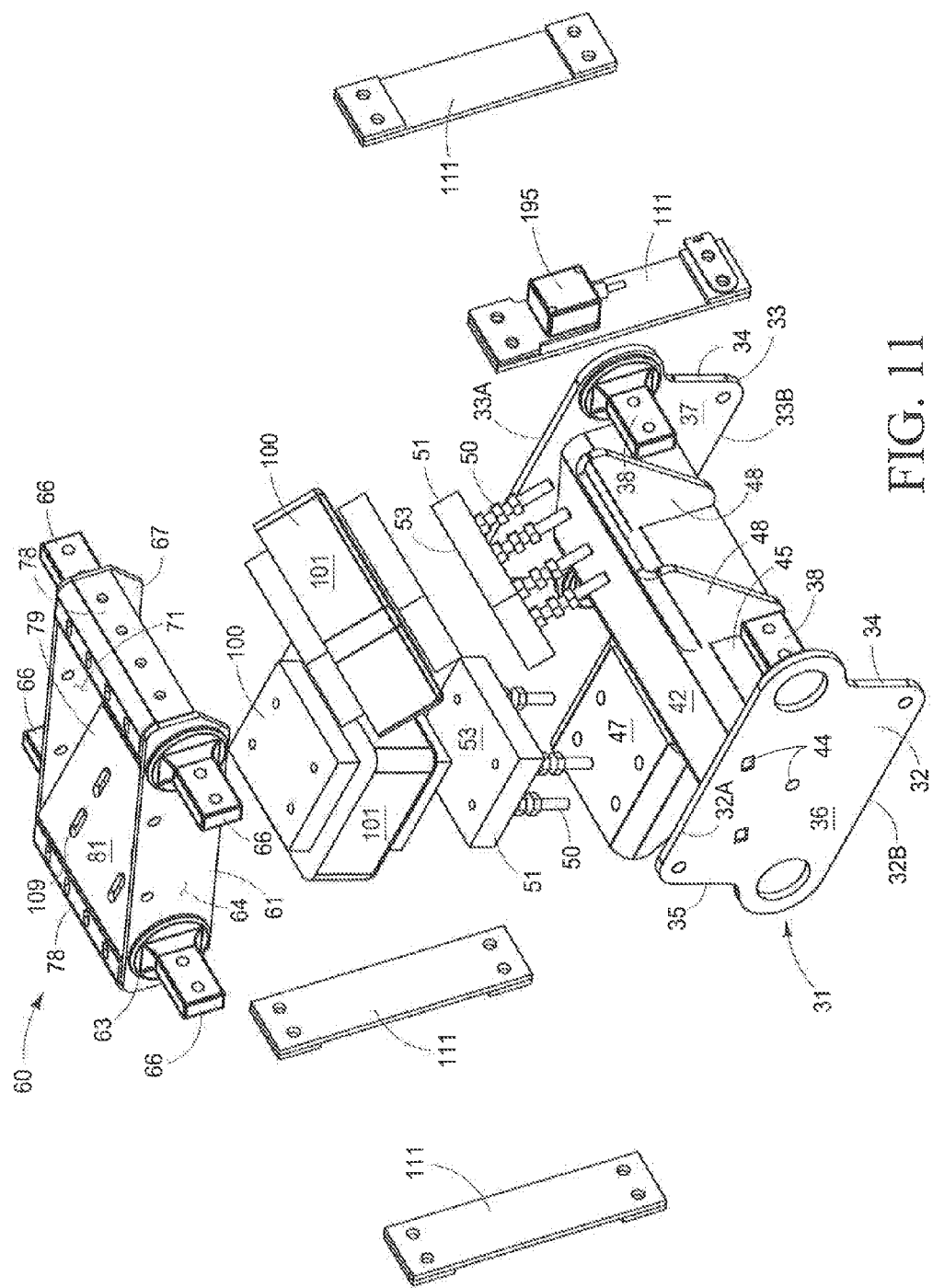
FIG. 11 is a second exploded, isometric top view of the drive assembly as seen in FIG. 8.

The drive saddle 31 (FIGS. 8.11) has a first side 32, and a second side 33. Each of the sides has a first end 34, and an opposing second end 35. The first side 32 and the second side 33 each have a laterally outer facing surface 36, and a laterally inner facing surface 37. Plural, spacedly arrayed fastener holes 44 are defined, or formed in each of the first side 32, and the second side 33 so as to provide a means for securing the drive saddle 31 within the medial channel 18, and which is defined by the stationary base 10. A crossbeam 45 extends transversely between the laterally inner facing surfaces 37 of the respective first side 32, and second side 33, and is generally oriented medially between the first end 34, and the second end 35. A first seat 46 and a second seat 47 are structurally carried by, or made integral with, the crossbeam 45 and extend angularly upwardly relative to a top surface 42 of the crossbeam 45 (FIG. 11). The respective seats 46 and 47 define a predetermined angle 52 therebetween. Gusset or support members 48 are structurally carried on a bottom surface of each seat 46 and 47, and are further located at each of the lateral edges thereof. The gusset members 48 structurally communicate with the crossbeam 45 so as to provide strength and rigidity to the first seat 46 and second seat 47, and further to maintain the predetermined angle 52 between the seats 46 and 47, respectively. A plurality of spacedly arrayed fastener holes 49 are defined or formed in the first and second seats 46, 47 so as to carry or cooperate with mounting rods 50. The mounting rods 50 positionally, and adjustably carry a magnetic interaction member 51 which is oriented in a position relative to the spacedly adjacent the first seat 46, and the second seat 47. Each of the respective magnetic interaction members 51 are preferably formed of a ferromagnetic material, such as steel, iron, or a composite and which magnets are attracted to, and/or repelled from in response to a predetermined applied magnetic field. The mounting rods 50 provide a means for adjustably positioning the magnetic interaction members 51 relative to the adjacent seats 46 and 47 respectively. In the disclosed embodiment, as illustrated, the mounting rods 50 have threads which allow for precise spatial adjustments and positioning of the magnetic interaction members 51 so as to ensure the magnetic interaction members 51 are oriented substantially parallel relation relative to the seat 46 and 47 which supports the same, and is further properly spaced from an adjacent electromagnet 100 as will be discussed hereinafter. Further, the interior angle 52 which is defined between the first seat 46 and the second seat 47 is the same as, or substantially similar to an interior angle 54 defined between the first magnetic interaction member 51, carried by the first seat 46, and the second magnetic interaction member 51 carried by the second seat 47. (FIG. 9).

A spring arm mount 38 is carried on the laterally inner facing surface 37 of the first side 32, and is further located proximate to the first end 34, and a top edge 32A. A second spring arm mount 38 is carried on the laterally inner facing surface 37 of the first side 32, and proximate to the second end 35, and a bottom edge 32B. Similarly a spring arm mount 38 is carried on the laterally inner facing surface 37 of the second side 33, and proximate to the first end 34 and top edge 33A and still another spring arm mount 38 is carried on the laterally inner facing surface 37 of the second side 33, and proximate to the second end 35, and a bottom edge 33B. A resilient spring or arm 111 is carried by each spring arm mount 38. The resilient spring or arm 111 extends generally angularly upwardly therefrom and is operable to mount and positionally carry or orient the magnet holder 60 in predetermined spaced relation relative to the drive saddle 31, and further provides for, or facilitates the reciprocal movement of the magnet holder 60 relative to the drive saddle 31.

The magnet holder 60 (FIGS. 8-11) has a first side 61, and an opposing and parallel second side 67. The first side 61, and the second side 67 each have a first end 62 and 68 respectively, and a second end 63 and 69 respectively. Further, each side 61, 67 has a laterally outer facing surface 64 and 70 respectively; and a laterally inner facing surface 65 and 71, respectively. A pair of end plates 78 individually extend transversely between the first side 61, and the second side 67, at the first end 62, 68; and another end plate 78 extends transversely between the first side 61, and the second side 67 at the second end 63, 69. A magnet saddle 79 structurally communicates with and extends transversely between the laterally inner facing surfaces 65, 71 of the first and second sides 61 and 67. The magnet saddle 79 is generally "V" shaped and has an angulated first wing 80, and an angulated second wing 81. The first and second wings 80 and 81 form with a vertex 84 at a vertically lowermost point between the angulated first wing 80 and the angulated second wing 81. In the disclosed embodiment, a predetermined angle 85 (FIG. 9) is formed between the angulated first wing 80 and the angulated second wing 81. The angle 85 is typically in a range of about 125° to about 145', and in one form of the invention is about 135'. The angle 85 is substantially similar to the angle 54 and which is defined between the two magnetic interaction members 51, and which are carried by the drive saddle 31. A plurality of spacedly arrayed fastener holes 109 are defined or formed in each angulated wing 80 and 81 and which further matingly cooperate with fasteners (not shown) so as to mount an electromagnet 100 on each of the wings 80 and 81 respectively.

A spring arm mount 66 is carried by each of the first side 61, and the second side 67 and at a location which is proximate to the first ends 62 and 68 and the second ends 63, 69, respectively, and on of the laterally outer facing surfaces 64, 71 thereof. The respective spring arm mounts 66 interconnect or cooperate with the springs or arms 39, and which are carried by the drive saddle 31. The springs or arms 39 are of known construction and are resilient so as to facilitate a reciprocal movement of the magnet holder 60 relative to the drive saddle 31 along a predetermined course of travel 83 (FIG. 3) when the drive assembly 30 is energized. Further, the springs or arms 39 positionally maintain the magnet holder 60 in a predetermined spaced relationship relative to the drive saddle 31.

In the embodiment as illustrated each electromagnet 100 has an electrical lead (not shown) for interconnection, or electrical coupling, with a controller 190. The controller 190 communicates with, or is coupled to an electrical power source (not shown). Each electromagnet 100 has a main body 101 and is generally rectilinear in shape, although other configurations and shapes are anticipated including, but not limited to, round, oval, polygonal and the like. Each electromagnet 100 has a lowermost, and generally planar surface 102 which is positioned proximate to the magnetic interaction member 51 when the magnet holder 60 is carried by the drive saddle 31. The generally planar surface 102 allows for the electromagnet 100 to be placed in close proximity to a generally planar top surface 53 of the magnetic interaction members 51. (FIG. 11). The spacing between each electromagnet 100 and its adjacent magnetic interaction member 51 is chosen so as to create a desired reciprocal motion of the magnet holder 60 relative to the drive saddle 31 when the controller 190 selectively energizes the drive assembly 30. In the disclosed embodiment, the spacing between the electromagnet 100, and the adjacent magnetic interaction member 51 is typically in a range between approximately 2 mm and 6 mm. In one possible form of the invention, the spacing is about 4 mm. The mounting rods 50 which carry or support the magnetic interaction members 51, as noted previously, are preferably threaded to allow the positioning of the magnetic interaction members 51 to be selectively adjustable relative to the adjacent electromagnet 100 so as to maintain the preferred spacing therebetween. The holder 60 and respective electromagnets 100 a given mass which facilitates the operation of the present invention as discussed below.

When energized by the controller 190, and which passes electrical energy having a predetermined voltage and amperage thereto, the electromagnets 100, in combination reciprocate the magnet holder 60, carrying the electromagnets 100 relative to the drive saddle 31, and generate a predetermined, physical force, which is directed along a line of reference 202 (FIG. 3), and which is directed through the center of mass 181 of the reciprocally moveable elongated conveyor bed 170. Upon the selective energizing by the controller 190, the electromagnets 100 are sequentially, and magnetically attracted to and then sequentially magnetically repelled from the adjacent magnetic interaction members 51. The sequential magnetic attraction, and sequential magnetic repulsion is affected by the controller 190 and which reverses the polarity of the respective electromagnets 100 at a predetermined frequency and amplitude. In the disclosed embodiment, the frequency is in a range of between approximately 10 Hz and 30 Hz. The resulting reciprocal motion of the magnet holder 60 and which carries the electromagnets 100 imparts reciprocal motion to the elongated conveyor bed 170, so as to cause movement of the product 201 between the second and first ends 172 and 171 thereof. As seen in FIG. 8, an accelerometer 195 is carried by the drive assembly 30 on one of the springs or arms 39. The accelerometer 195 provides frequency and amplitude information to controller 190 and further provides monitoring of the operation of the drive assembly 30.

Figure 7:
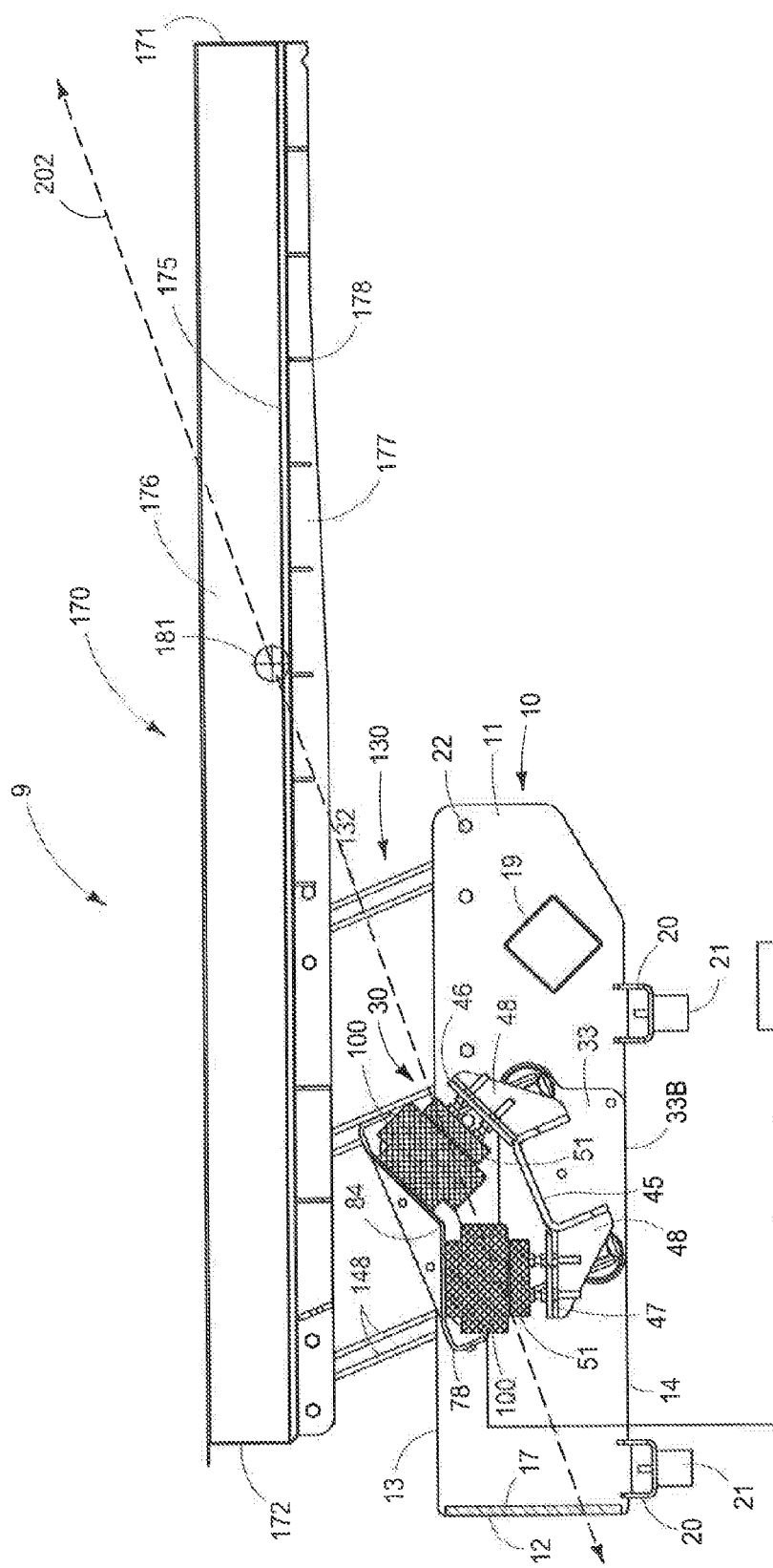
FIG. 7 is an longitudinal sectional view of the vibratory conveyor of FIG. 1 and which is taken along line 7-7 of FIG. 4.

Referring now to FIG. 7, a greatly simplified arrangement for rendering the present invention 9 operational, is shown. In this arrangement, it will be seen that the controller 190 can, in one form of the invention, constitute a regular, general purpose computer, and is further coupled in controlling relation relative to the vibratory conveyor 9. The controller 190 generates an appropriate electrical signal and output, and which is then provided to the respective electromagnets 100 so as to energize the same, and produce reciprocal movement of the magnet holder 60 relative to the drive saddle 31, and which is further made integral therewith. An operator, not shown, therefore may use the controller 190 to change both the frequency and the amplitude of the electrical current provided to the electromagnets 100, so as to effect the resulting vibratory motion imparted to the reciprocally moveable elongated conveyor bed 170. This allows the vibratory conveyor 9 to be immediately, and dynamically adjusted, based upon the operational conditions being experienced by the reciprocally moveable elongated conveyor bed 170. Further, this arrangement also allows for the simultaneous and selective energizing of the electromagnets 100, in a given manner, so as to avoid the prior art problems which are associated with ramping up, or ramping down of an out-of-balance motor through given resonance modes, which may be possessed by the reciprocally moveable elongated conveyor bed 170. Because this problem is substantially eliminated lighter gauge materials can be used to fabricate the base 10 and elongated conveyor bed 170. This reduced gauge material results in lower costs to fabricate the conveyor device 9. This arrangement also avoids many of the problems associated with the bending and twisting and yawing of any elongated conveyor bed 170, as previously experienced, and when using the prior art out-of-balance motors heretofore. Still further, and because of this arrangement, the earlier "tuning" which was utilized, heretofore, with regard to out-of-balance motors has been substantially eliminated. Moreover, as a result, the controller 190 may be utilized to precisely fine-tune or adjust the operation of the vibratory conveyor 9, thus eliminating the need for high degrees of precision when assembling the vibratory conveyor 9, as was previously the case with prior art excited frame conveyors which have been utilized in the past. Additionally, and in one possible form of the invention, other sensors (not shown) may be deployed on the reciprocally moveable elongated conveyor bed 170, and/or the drive assembly 30, or components thereof, and which can provide feedback to the controller 190, in order to further fine tune or precisely adjust the operation of the vibratory conveyor 9 in a manner which has been not possible heretofore.

Those skilled in the art will recognize that the relative positions of the electromagnets 100, and the associated magnetic interaction members 51 could be reversed. In this possible arrangement the magnetic interaction members 51 would be carried by the magnet holder 60, and the electromagnets 100 would be carried by the drive saddle. To render this arrangement operational the respective magnetic interaction members 51 would increase in math so as to generate the force necessary to effect the resulting reciprocal motion of the elongated conveyor bed 170.

Operation

The operation of the described embodiment of the present invention is believed to be readily apparent and are briefly summarized at this point.

In its broadest aspect, the prevent invention relates to a vibratory conveyor 9, which includes a reciprocally moveable elongated conveyor bed 170, and which has a product conveying surface 175. A drive assembly 30 is provided, and which is oriented in spaced relation relative to the reciprocally movable elongated conveyor bed 170. When energized, the drive assembly 30 imparts reciprocal motion to the elongated conveyor bed 170 to move a product 201 along the product conveying surface 175, of the reciprocally movable elongated conveyor bed 170. The present invention also includes a stationary base 10, which is positioned on an adjacent supporting surface 200, and which supports the reciprocally moveable elongated conveyor bed 170 in spaced relation relative to the supporting surface 200. The vibratory conveyor 9 further includes a multiplicity of pairs of elongated and resilient springs 132, 140 and 148, and which couple the reciprocally moveable and elongated conveyor bed 170 to the stationary base 10. The multiplicity of pairs of elongated and resilient springs 132, 140 and 148 locate the reciprocally moveable and elongated conveyor bed 170 in spaced relation relative to the stationary base 10. In the arrangement as seen in FIG. 1, and following, the reciprocally moveable and elongated conveyor bed 170 has a longitudinal axis 182. The respective pairs of elongated and resilient spring legs 132, 140 and 148 are oriented in parallel, spaced relation relative to the longitudinal axis 182 of the reciprocally moveable elongated conveyor bed 170.

The drive assembly 30 is mounted on the stationary base 10. When the electromagnets 100 are energized, the sequential magnetic attraction and magnetic repulsion of the electromagnets 100 relative to the magnetic interaction members 51 and which are carried by the drive saddle 31 reciprocates the magnet holder 60 in a manner so as to generate a predetermined force, which is directed along the given line of reference 202 (FIG. 3) and which passes through the center of mass 181 of the reciprocally moveable elongated conveyor bed 170. In all the forms of the invention as disclosed, the controller 190 as provided is coupled to the respective electromagnets 100, and further controls the reciprocal movement of the magnet holder 60, so as to effect the subsequent movement of the product 201, along the product conveying surface 175 of the reciprocally moveable elongated conveyor bed 170 in a manner not possible heretofore.

In all forms of the invention 9 as described, the reciprocally moveable elongated conveyor bed 170 has a natural reciprocal frequency which affects an optimal movement of the product 201 along the conveying surface 175. In this regard, the weight of the respective electromagnets 100 in combination with the weight of the magnet holder 60, is selected so as to impart the natural reciprocal frequency to the reciprocally moveable and elongated conveyor bed 170. In all forms of the invention, the reciprocally moveable and elongated conveyor bed 170 has a maximum reciprocal stroke, and wherein the product 201 can move along the product conveying surface 175, and a variably adjustable speed up to the maximum reciprocal stroke attributable to the reciprocally moveable elongated conveyor bed 175 which is employed. In the disclosed embodiment, the reciprocal stroke is located in a range of between approximately 2 mm and 20 mm, although the reciprocal stroke may be adjusted depending upon the product 201 being transported upon the product conveying surface 175.

It should be understood that each of the stationary base 10 and the reciprocally movable and elongated conveyor bed 170, as depicted and described, have individual weights, and wherein the ratio of the weight of the stationary base 10, to the weight of the reciprocally movable and elongated conveyor bed 170 is about 50% to about 125%. In the arrangement as seen in the drawings, the reactive mass, which comprise the respective electromagnets 100 and the magnet holder 60 typically has a weight of about 27 Kg to about 33 Kg and the weight of the reciprocally movable and elongated conveyor bed 170 is about 36 Kg to about 44 Kg. Still further, when the electromagnets 100 are energized, the electromagnets 100 and the magnet holder 60 reciprocate at a frequency of about 10 Hz, to about 30 Hz. further, the voltage and amperage supplied to the respective electromagnets 100 by the controller 190 may be varied and adjusted so as to maximize the desired rate of movement of the product 201 along the product conveying surface 175.

Therefore, it will be seen that the present invention provides a convenient means for controlling the operation of a reciprocally moveable and elongated conveyor bed 170, in a manner not possible heretofore. The present invention is convenient, easy to operate, substantially avoids all the impediments and shortcomings of the prior art teachings utilized heretofore, and provides a means by which an operator can readily detect and then control the operation of the reciprocal elongated conveyor bed 170 in a manner to achieve selective and efficient delivery of particulate matter, to downstream manufacturing processes.

In compliance with the statute, the invention has been described in language more or less specific as to structural and methodical features. It is to be understood, however, that the invention is not limited to the specific features shown and described, since the means herein disclosed comprise preferred forms of putting the invention in effect. The invention is, therefore, claimed in any of its forms or modifications within the proper scope of the appended claims appropriately interpreted according to the Doctrine of Equivalence.

I claim:

1. A vibratory conveyor, comprising:
   an elongated, reciprocally movable conveyor bed for carrying a product along a path of travel, and wherein the movable conveyor bed has a center of mass;
   a base for supporting the reciprocally movable conveyor bed;
   a multiplicity of elongated springs extending from the base, and supporting the reciprocally movable conveyor bed in spaced, reciprocally movable relation relative to the base; and
   a drive assembly mounted on the base, and which has a pair of angulated magnet interaction members and a pair of reciprocally movable electromagnets which are biasingly spaced from the respective magnet interaction members, and wherein a selective energizing of the respective electromagnets effect a reciprocal motion of the electromagnets so as to create a reciprocating force which extends along a predetermined line of reference which passes through the center of mass of the reciprocally movable elongated conveyor bed, and which affects the movement of the product along the path of travel of the conveyor bed.

2. A vibratory conveyor, comprising:
   a base having opposite first and second ends, and opposite sides which are spaced apart a predetermined distance, and wherein a medial channel is defined between the opposite sides, and wherein a support beam extends between the opposite sides and is disposed transversely of the opposite sides;
   an elongated conveyor bed which is moveably mounted on, and disposed in spaced relation relative to, the base, and wherein the elongated conveyor bed has opposite first and second ends, and a center of mass, and wherein the elongated conveyor bed has a supporting surface which carries a product between the first and second ends thereof when the elongated conveyor bed is reciprocally moved in a predetermined manner;
   a first multiplicity of elongated springs, each having a first end which is mounted on the base, and a second end which is mounted on the elongated conveyor bed, and which further reciprocally support the elongated conveyor bed so as to effect movement of the product along the supporting surface of the conveyor bed; and
   a drive assembly borne by the base, and located within the medial channel, and wherein the drive assembly includes a drive saddle which defines two discrete seats, and wherein the respective seats are mounted in a predetermined angular orientation, one relative to the other, and wherein a magnet interaction member is adjustably borne by each of the discrete seats; and wherein the drive saddle further includes a multiplicity of spring mounts located in a predetermined pattern; and wherein a second multiplicity of elongated springs each have a first end mounted on the respective spring mounts and further extend outwardly therefrom, and wherein each of the respective second multiplicity of elongated springs have a distal second end; a magnet holder reciprocally supported by the second end of the second multiplicity of elongated springs in a predetermined, spaced relationship relative to the drive saddle, and wherein the magnet holder mounts a pair of selectively energizable electromagnets in a given angular, and spaced orientation relative to the respective magnetic interaction members, and wherein the magnet holder, and the respective electromagnets have a given mass, and are reciprocally moveable along a line of force which extends from the drive assembly through the center of mass of the elongated conveyor bed, and wherein selective energizing of the respective electromagnets draws or repels the respective electromagnets from the respective magnet interaction members, and further causes a corresponding reciprocal motion of the magnet holder and the respective electromagnets, and wherein the reciprocal motion of the magnet holder, and the respective electromagnets generates a force along the line of force which effects a corresponding reciprocal motion of the elongated conveyor bed, and a movement of the product along the supporting surface thereof.

3. The vibratory conveyor as claimed in claim 2, and further comprising:
   an end panel communicating between the first side and the second side at the first end of the base.

4. The vibratory conveyor as claimed in claim 3, and wherein the drive saddle has a first side, and a parallel, spaced apart, second side, and wherein each side has a first end, and a second end, and wherein each side further has a laterally outwardly facing surface, and an opposing laterally inwardly facing surface; and wherein the crossbeam structurally communicates between the first side laterally inwardly facing surface, and the second side, laterally inwardly facing surface.

5. The vibratory conveyor as claimed in claim 4, and wherein the discrete seats comprise first and second angulated seats, and wherein the crossbeam structurally carries the angulated first seat between the first side, and the second side and at a location proximate to the first end, and the angulated second seat is carried between the first side, and the second side, at a location which is proximate to the second end.

6. The vibratory conveyor as claimed in claim 5, and wherein the first and second seats form an angle of approximately 125 degrees and 145 degrees, therebetween.

7. The vibratory conveyor as claimed in claim 6, and wherein each of the angulated seats further define a plurality of spaced holes for receiving individual mounting posts which adjustably position and carry one of the magnetic interaction members.

8. The vibratory conveyor as claimed in claim 7, and wherein the first and the second sides of the drive saddle each carry a spring arm mount on the laterally inwardly facing surface, and at a location which is proximate to the first and second ends, and wherein each spring arm mounts at least one of the elongated springs which carry the magnet holder in a spaced orientation adjacent to the drive saddle.

9. The vibratory conveyor as claimed in claim 8, and wherein the magnet holder has a first side, and a spaced apart, and parallel, second side, and wherein each side has a first end, and a second end, and each side further has a laterally, outwardly facing surface, and an opposing, laterally, inwardly facing surface, and wherein the magnet saddle is carried between the first side inwardly facing surface, and the second side inwardly facing surface.

10. The vibratory conveyor as claimed in claim 9, and wherein the angulated first magnet seat is located between the first side, inwardly facing surface, and the second side, inwardly facing surface, and at a location which is proximate to the first end, and the angulated second magnet seat, is located opposite the first magnet seat, and which is further located between the first side inwardly facing surface, and the second side inwardly facing surface, and at a location which is proximate to the second end.

11. The vibratory conveyor as claimed in claim 10, and wherein an angle is formed between the first magnet seat and the second magnet seat which is in a range of about 125 degrees and 145 degrees.

12. The vibratory conveyor as claimed in claim 11, and wherein each magnet seat defines a plurality of spaced fastener holes for mounting at least one electromagnet.

13. The vibratory conveyor as claimed in claim 12, and wherein the magnet holder first side, and the magnet holder second side, each carry a spring arm mount on a laterally outwardly facing surface thereof, and at locations proximate to the first and second end.

14. The vibratory conveyor as claimed in claim 13, and wherein the second multiplicity of elongated springs are mounted on, and communicates between the magnet holder spring arm mount, and the drive saddle spring arm mount to support the magnet holder in a spaced orientation which is adjacent the drive saddle.

15. The vibratory conveyor as claimed in claim 14, and wherein the selectively energizable electromagnet which is mounted on each magnet seat of the magnet holder, when rendered operable, sequentially, magnetically attracts, and then sequentially magnetically repels the magnetic interaction member which is carried by the drive saddle when a source of electrical energy is selectively supplied to the respective electromagnets by any electrical power source which is selectively supplied by a controller.

16. The vibratory conveyor as claimed in claim 15, and wherein the sequential magnetic attraction and the subsequent, sequential, magnet repulsion which effects the movement of the electromagnets in a direction towards, and away from the magnetic interaction members, and in response to receiving the electrical power from the controller, generates a reciprocating force along the predetermined line of reference.

17. The vibratory conveyor as claimed in claim 16, and wherein the supporting surface of the elongated conveyor bed defines a product transporting surface which supports a product for movement between the respective opposite ends of the elongated conveyor bed, and further has a bottom surface.

18. The vibratory conveyor as claimed in claim 17, and wherein the controller is electrically coupled with a source of electrical power, and wherein the controller selectively supplies electricity to the respective electromagnets thereby causing the respective electromagnets to generate a predetermined magnetic field having a first polarity and a second polarity, respectively.

19. The vibratory conveyor as claimed in claim 18, and wherein when the first electromagnet is energized by the controller to the first polarity, the second electromagnet is energized to the second polarity by the controller and visa versa.

20. The vibratory conveyor as claimed in claim 19, and wherein the polarities of the respective electromagnets may be sequentially reversed by the controller so as to cause the magnet holder to reciprocally move relative to the drive saddle at a desired frequency, and amplitude, along the line of reference.

21. The vibratory conveyor as claimed in claim 20, and wherein the frequency and the amplitude of the magnet holder movement may be adjusted by the controller.

22. The vibratory conveyor as claimed in claim 21, and wherein the generated reciprocal force, and the resulting reciprocal motion of the elongated conveyor bed effects movement of the product along the product transporting surface, and between the first and second ends of the elongated conveyor bed.

23. A vibratory conveyor, comprising:
a base having a first side, and a spaced apart, and parallel, second side, and wherein the first and second sides each have a first end, a second end, a top edge and a bottom edge, and wherein an end panel communicates between the first side, and the second sides at the first end thereof, and wherein a structural beam communicates between the first side, and the second side, and is further located proximate to the second end of the base, and wherein the base further defines a medial channel which is located between the first and second sides;
a drive assembly which is borne by the base, and is further carried within the medial channel, and wherein the drive assembly comprises a drive saddle, a magnet holder, and two selectively energizable electromagnets, and wherein the drive saddle has a first side, and a parallel, spaced apart, second side, and wherein each side has a first end, and a second end, and wherein each side further has a laterally outwardly facing surface, and an opposing, laterally inwardly facing surface, and wherein a crossbeam structurally communicates between the first side, inwardly facing surface, and the second side, inwardly facing surface, and wherein the crossbeam structurally carries an angulated first seat between the first side, and the second side, and at a location which is proximate to the first end, and an angulated second seat which is carried between the first side, and the second side, at a location which is proximate to the second end thereof, and wherein the first and second seats form an angle therebetween and which lies in a range of about 125 degrees and 145 degrees, and wherein each seat further defines a plurality of spaced holes for receiving individual mounting posts which adjustably position and carry a magnetic interaction member, and wherein the first and the second sides each carry a spring arm mount on the laterally inwardly facing surface and a location which is proximate to the first and second ends thereof, and wherein each spring arm mounts an elongated spring arm which carries the magnet holder in a spaced orientation relative to the drive saddle; and wherein the magnet holder has a first side, and a spaced apart, and parallel, second side, and wherein each side has a first end, and a second end, and each side further has a laterally outwardly facing surface, and an opposing, laterally inwardly facing surface, and wherein a V-shaped magnet saddle is carried between the first side, and the second side, and wherein the magnet saddle has an angulated, first magnet seat and an angulated second magnet seat, which is located opposite the first magnet seat, and wherein an angle is formed between the first magnet seat and the second magnet seat which is in a range of about 125 degrees and 145 degrees, and wherein each magnet seat, further defines a plurality of spaced fastener holes for mounting an electromagnet, and wherein the magnet holder first and second sides, each carry a spring arm mount on the laterally outwardly facing surface thereof, and proximate to the first and second ends thereof, and individual elongated spring arms are mounted on each spring arm mount, and to the drive saddle to support the magnet holder in the spaced orientation relative to the drive saddle:

a selectively energizable electromagnet mounted on each magnet seat of the magnet holder and, which, when rendered operable, sequentially, and magnetically attracts, and sequentially, magnetically repels the magnetic interaction member which is carried by the drive saddle when a source of electrical energy is selectively supplied to the electromagnet by a controller, and wherein the sequential magnetic attraction and sequential magnet repulsion causes the respective electromagnets to move towards, and then move away from the respective magnetic interaction members in response to receiving the electrical energy which is selectively supplied by the controller, and wherein the movement of the electromagnets generates a force along a predetermined line of reference;

an elongated conveyor bed having opposite first and second ends, a top surface defining a product transporting surface which supports a product for movement between the respective opposite ends of the elongated conveyor bed, and a bottom surface, and wherein the elongated conveyor bed is reciprocally and resiliently supported in spaced relation relative to the base, and wherein the elongated conveyor bed has a center of mass through which the predetermined line of reference passes;

a multiplicity of elongated springs which individually, and resiliently support the respective first and second ends of the elongated conveyor bed in spaced relation relative to the base, and wherein each of the multiplicity of elongated springs have a respective first end which is fixedly attached to the base, and an opposite second end, which is fixedly affixed to the elongated conveyor bed; and a controller which electrically and operationally communicates with a source of electrical power, and wherein the controller selectively supplies electricity to the electromagnets so as to cause the electromagnets to generate individual magnetic fields having a first polarity, and a second polarity, and wherein when the first electromagnet is energized to the first polarity by the controller, the second electromagnet is energized to the second polarity, and wherein the polarities of the respective electromagnets may be sequentially reversed by the controller thereby causing the magnet holder to reciprocally move relative to the drive saddle at a desired frequency, and amplitude, and along the line of reference, and wherein the frequency of the magnet holder movement may be adjusted by the controller, and wherein the reciprocal movement of the magnet holder relative to the drive saddle generates a predetermined amount of vibratory force which is imparted to the elongated conveyor bed, so as to effect reciprocal motion of the elongated conveyor bed, and facilitate the movement of the product along the product transporting surface.

* * * * *